UNITED STATES PATENT OFFICE.

ALBERTO FRANCESCO DELACOURT, OF GENOA, ITALY, ASSIGNOR TO SOCIETÀ ANONIMA ITALIANA GIO. ANSALDO & C., OF GENOA, ITALY.

PROCESS OF MAKING PHOSPHO-POTASSIC FERTILIZER.

1,282,385.      Specification of Letters Patent.      Patented Oct. 22, 1918.

No Drawing.      Application filed June 5, 1918.      Serial No. 238,293.

*To all whom it may concern:*

Be it known that I, ALBERTO FRANCESCO DELACOURT, a subject of the King of Italy, and residing at Genoa, Italy, have invented certain new and useful Improvements in Processes of Making Phospho-Potassic Fertilizer, of which the following is a specification.

This invention relates to a phospho-potassic fertilizer for the production of which are utilized, employing a new thermo-chemical process, rocks containing small amounts of insoluble potash (silicates in general kaolins, feldspar, and the like) together with rocks poor in phosphorus.

Said process is characterized by the introduction of grains, fragments or conglomerates of the above stated rocks together with predetermined quantities of silicate of calcium, or of sand and lime, into any type of furnace, then subjecting the whole mass to a temperature (about 1000° to 1100° C.), sufficiently high to chemically alter, but not to fuse the materials, then said mass is taken out and, if desired, hydrated.

The technical details of such process are the following:

1.—The quantity of lime and silica shall be in relation such to the quantity of the phosphoric and potassic minerals or rocks, that a complete combination between the lime and silica shall be effected, to allow complete dissociation of the tricalcium phosphate and of the rocks containing potassium to obtain a potassium-calcium phosphate mixed with silicate of calcium. It is, of course, evident that the quantities of silica and lime which shall be added cannot be determined before the percentages of lime and silica in the minerals or rocks to be treated are known exactly.

The following examples illustrate this statement:

(a)—From 100 parts of leucite containing 15% $K_2O$;
From 100 parts of phosphorites of the Nile containing 47% $Ca_3P_2O_8$ (=21.4% $P_2O_5$);
From 50 parts of $SiO_2$
is obtained a fertilizer having about 10 to 12% of $P_2O_5$ and from 5% of $K_2O$.

(b)—From 100 parts of leucite containing 15% of $K_2O$;
From 250 parts of phosphate of Belgium containing 26% $P_2O_5$;
From 125 parts of $SiO_2$
is obtained a fertilizer with 10 to 12% of $P_2O_5$ and 3 to 4% of $K_2O$.

(c)—From 150 parts of leucite containing 15% of $K_2O$;
From 100 parts of phosphates of Gafsa containing 72% of $Ca_3P_2O_8$ (=33% $P_2O_5$);
From 50 parts of $SiO_2$
is obtained a fertilizer with 9 to 11% of $P_2O_5$ and 7 to 8% of $K_2O$.

(d)—From 200 parts of leucite with 15% of $K_2O$;
From 200 parts of Canadian apatite with 41% of $P_2O_5$ and 55% of CaO
is obtained a fertilizer with 18 to 20% of $P_2O_5$ and 4 to 5% of $K_2O$.

2.—The fuel within the furnace is to be burned in an oxidizing flame, to prevent the reduction of the phosphoric acid following the combustion and calcination of the organic substances usually contained in the minerals.

3.—The gases produced from the combustion shall pass through the cool mass of the substances to be calcined to condense the potash volatilized by the local overheating produced, for example, by the combustion of the organic substances present in the minerals.

The most suitable type of furnace is the counter-current rotary kiln.

4.—The temperature is not to be allowed to rise above the point necessary to effect the softening of the mass, said softening point indicating the accomplished mutual completion of the chemical action between the tricalcium phosphates and the potassium silicates. The necessary temperature is usually between 1000° and 1100° C., and in any case is not above 1300° C. because at this temperature excessive quantities of the potash would be volatilized and lost.

5.—As soon as the softening of the mass is obtained, the heating is at once stopped to prevent a too great decrease of the percentage of the potash and of the phosphoric anhydrid.

I claim:—

1. A process of producing a phosphatic potassic fertilizer which comprises heating only to a temperature capable of softening the mass, a mixture of materials containing tri-calcium phosphate, a potassium-containing silicate rock, and free silica.

2. A process of making a fertilizer containing available phosphoric acid and potassium compounds, which comprises heating only to about 1000 to 1100° C., a mixture of materials containing tri-calcium phosphate, a potassium-containing silicate rock, and free silica.

In testimony whereof I have hereunto signed my name in the presence of two witnesses.

ING. ALBERTO FRANCESCO DELACOURT.

Witnesses:
 DOMENO VILLY,
 ERNSTI RIVING.